United States Patent
Yun et al.

(10) Patent No.: US 11,647,363 B2
(45) Date of Patent: *May 9, 2023

(54) APPARATUS, CIRCUIT AND METHOD FOR CONTROLLING SERVICE ACCESS IN PACKET DATA COMMUNICATION SYSTEM

(71) Applicant: Samsung Electronics Co., Ltd., Suwon-si (KR)

(72) Inventors: Il-Kwon Yun, Yongin-si (KR); Min-Suk Ko, Seoul (KR); Yong-Duk Lim, Suwon-si (KR); Kyeong-In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,681

(22) Filed: Nov. 29, 2021

(65) Prior Publication Data

US 2022/0086603 A1 Mar. 17, 2022

Related U.S. Application Data

(63) Continuation of application No. 16/824,148, filed on Mar. 19, 2020, now Pat. No. 11,190,910, which is a (Continued)

(30) Foreign Application Priority Data

Feb. 19, 2013 (KR) .................. 10-2013-0017544

(51) Int. Cl.
*H04W 4/06* (2009.01)
*H04W 72/00* (2023.01)
*H04W 72/30* (2023.01)

(52) U.S. Cl.
CPC ............. *H04W 4/06* (2013.01); *H04W 72/30* (2023.01)

(58) Field of Classification Search
CPC ....... H04W 72/005; H04W 4/06; H04W 8/26; H04L 12/189; H04L 12/185
(Continued)

(56) References Cited

U.S. PATENT DOCUMENTS 6,510,515 B1  1/2003  Raith
8,588,792 B2  11/2013  Lee et al.
(Continued)

FOREIGN PATENT DOCUMENTS

KR  10-2011-0089839 A  8/2011
KR  10-2012-0124015 A  11/2012
(Continued)

OTHER PUBLICATIONS

3GPP TSG CT WG1 Meeting #58, Apr. 20-24, 2009, Sophia Antipolis, Fance, C1-091739, Source: NTT Docomo, Panasonic, NEC, NTT, Toshiba, Hitachi, Title: Service Specific Access Control: Way Forward. (Year: 2009).*
(Continued)

*Primary Examiner* — Peter G Solinsky
*Assistant Examiner* — Sanjay K Dewan
(74) *Attorney, Agent, or Firm* — Jefferson IP Law, LLP

(57) ABSTRACT

An apparatus, circuit, and method for controlling a service access in a packet data communication system are provided. The method includes broadcasting information related to whether a service access to a specific service is possible.

14 Claims, 9 Drawing Sheets

Related U.S. Application Data continuation of application No. 14/107,431, filed on Dec. 16, 2013, now Pat. No. 10,887,730.

(58) Field of Classification Search
USPC .......................................................... 370/312
See application file for complete search history.

(56) References Cited

U.S. PATENT DOCUMENTS

| | | |
|---|---|---|
| 8,902,856 B2 | 12/2014 | Xing et al. |
| 8,948,751 B2 | 2/2015 | Zhang et al. |
| 8,971,893 B2 | 3/2015 | Li et al. |
| 9,107,183 B2 | 8/2015 | Anchan et al. |
| 9,131,429 B1 | 9/2015 | Bharadwaj et al. |
| 9,215,645 B2 | 12/2015 | Susitaival |
| 9,264,979 B2 | 2/2016 | Fong et al. |
| 9,271,323 B2 | 2/2016 | Nam et al. |
| 9,301,239 B2 | 3/2016 | Jung et al. |
| 9,485,710 B2 | 11/2016 | Jung et al. |
| 9,565,550 B2 | 2/2017 | Klatt |
| 2003/0195003 A1 | 10/2003 | Cao et al. |
| 2005/0120208 A1 | 6/2005 | Albert Dobson |
| 2008/0013471 A1 | 1/2008 | Kim |
| 2008/0152126 A1 | 6/2008 | Pitkamaki et al. |
| 2008/0162637 A1 | 7/2008 | Adamczyk et al. |
| 2009/0040982 A1 | 2/2009 | Ho et al. |
| 2010/0142412 A1 | 6/2010 | Synnergren et al. |
| 2010/0159928 A1 | 6/2010 | Wu |
| 2010/0169483 A1 | 7/2010 | Jalkanen |
| 2010/0184448 A1* | 7/2010 | Wu ................... H04W 76/10 455/450 |
| 2010/0296421 A1 | 11/2010 | Waft et al. |
| 2010/0323662 A1 | 12/2010 | Dahlen et al. |
| 2011/0069618 A1 | 3/2011 | Wong et al. |
| 2011/0141908 A1 | 6/2011 | Ishida et al. |
| 2011/0201307 A1 | 8/2011 | Segura |
| 2011/0244907 A1 | 10/2011 | Golaup et al. |
| 2012/0033613 A1* | 2/2012 | Lin ..................... H04W 74/085 370/328 |
| 2012/0040643 A1 | 2/2012 | Diachina et al. |
| 2012/0170503 A1 | 7/2012 | Kelley et al. |
| 2012/0281530 A1 | 11/2012 | Sambhwani et al. |
| 2012/0282965 A1 | 11/2012 | Kim et al. |
| 2012/0322484 A1 | 12/2012 | Yu et al. |
| 2013/0028183 A1 | 1/2013 | Praquin |
| 2013/0034071 A1 | 2/2013 | Lee et al. |
| 2013/0083777 A1 | 4/2013 | Rydnell et al. |
| 2013/0107858 A1 | 5/2013 | Takahashi et al. |
| 2013/0122906 A1 | 5/2013 | Klatt |
| 2013/0128733 A1 | 5/2013 | Lee et al. |
| 2013/0130691 A1* | 5/2013 | Zhu .................. H04W 28/0289 455/436 |
| 2013/0170446 A1 | 7/2013 | Zheng |
| 2013/0194998 A1 | 8/2013 | Susitaival et al. |
| 2013/0215742 A1 | 8/2013 | Sirotkin et al. |
| 2013/0301547 A1 | 11/2013 | Gupta et al. |
| 2014/0004857 A1 | 1/2014 | Rune et al. |
| 2014/0036669 A1 | 2/2014 | Yang et al. |
| 2014/0036792 A1 | 2/2014 | Li et al. |
| 2014/0064176 A1 | 3/2014 | Anchan |
| 2014/0119267 A1 | 5/2014 | Santhanm et al. |
| 2014/0126508 A1 | 5/2014 | Young et al. |
| 2014/0128029 A1 | 5/2014 | Fong et al. |
| 2014/0233448 A1 | 8/2014 | Yun et al. |
| 2014/0247730 A1 | 9/2014 | Thota et al. |
| 2014/0376360 A1 | 12/2014 | Lisak et al. |
| 2015/0049662 A1* | 2/2015 | Kim ..................... H04W 48/20 370/312 |
| 2015/0071064 A1 | 3/2015 | Geng et al. |
| 2015/0119015 A1 | 4/2015 | Gai et al. |
| 2015/0249951 A1 | 9/2015 | Jung et al. |
| 2016/0073331 A1 | 3/2016 | Balakrishnan et al. |
| 2016/0100337 A1 | 4/2016 | Wu et al. |
| 2016/0135143 A1 | 5/2016 | Won et al. |
| 2016/0149966 A1 | 5/2016 | Remash et al. |
| 2016/0198336 A1 | 7/2016 | Kim et al. |
| 2016/0205040 A1 | 7/2016 | Wirtanen et al. |
| 2016/0353356 A1* | 12/2016 | Payyappilly .......... H04L 47/193 |
| 2017/0295536 A1 | 10/2017 | Kim et al. |
| 2019/0150061 A1* | 5/2019 | Ishii ..................... H04L 63/101 370/329 |

FOREIGN PATENT DOCUMENTS

| | | | |
|---|---|---|---|
| WO | 2013/022474 A1 | 2/2013 | |
| WO | WO 2013/022474 A1 * | 2/2013 | ............ H04W 48/10 |

OTHER PUBLICATIONS

3GPP TS 22.011 v11.2.0 (Dec. 2011), 3rd Generation Partnership; Technical Specification Group Services and System Aspects; Service Accessibility (Release 11) (Year: 2011).*

3GPP TS 36.331 v10.1.0 (Mar. 2011) 3rd Generation Partnership Project; Technical Specification Group Radio Access Network; Evolved Universal Terrestrial Radio Access (E-UTRA); Radio Resource Control (RRC); Protocol Specification (Release 10). (Year: 2011).*

NTT Docomo et al., Service Specific Access Control: Way Forward, 3GPP TSG CT WG1 Meeting #58, C1-091739, XP050337345, Apr. 27, 2009, Sophia Antipolis, France.

3rd Generation Partnership Project; 3GPP; Technical Specification Group Radio Access Network; Evolved Universal Terrestrial Radio Access (E-UTRA); Radio Resource Control (RRC); Protocol specification (Release 10), 3GPP TS 36.331 V10.1.0, XP-002669861, Mar. 30, 2011, Sophia Antipolis, France.

3GPP TSG CT WG1 Meeting #58, Apr. 20-24, 2009 Sophia Antipolis, France, C1-091739, Source: NTT Docomo, Panasonic, NEC, NTT, Toshiba, Hitachi, Title: Service Specific Access Control, Work Item TBD/Rel-9.

U.S. Non-final Office Action dated May 21, 2020, issued in U.S. Appl. No. 14/107,431.

3GPP, "3rd Generation Partnership Project; Technical Specification Group Services and System Aspects; Service accessibility (Release 11)", XP055747906, Dec. 1, 2011.

European Office Action dated Nov. 16, 2020, issued in European Patent Application No. 20166185.7.

"3rd Generation Partnership Project; Technical Specification Group Radio Access Network; Evolved Universal Terrestrial Radio Access (E-UTRA); Radio Resource Control (RRC); Protocol specification (Release 11)", 3GPP Standard, 3GPP TS 36.331, V11.2.0, Dec. 19, 2012, pp. 1-340, XP050691590.

European Office Action dated Mar. 30, 2022, issued in European Patent Application No. 20166185.7.

European Office Action dated Sep. 23, 2022, issued in European Application No. 20 166 185.7.

* cited by examiner

APPARATUS, CIRCUIT AND METHOD FOR CONTROLLING SERVICE ACCESS IN PACKET DATA COMMUNICATION SYSTEM

PRIORITY

This application is a continuation application of prior application Ser. No. 16/824,148, filed on Mar. 19, 2020, which is a continuation application of prior application Ser. No. 14/107,431, filed on Dec. 16, 2013, which has issued as U.S. Pat. No. 10,887,730 on Jan. 5, 2021 and is based on and claims priority under 35 U.S.C. § 119(a) of a Korean patent application number 10-2013-0017544, filed on Feb. 19, 2013, in the Korean Intellectual Property Office, the disclosure of which is incorporated by reference herein in its entirety.

BACKGROUND OF THE INVENTION

1. Field of the Invention

The present invention relates to an apparatus, circuit, and method for controlling a service access in a packet data communication system. More particularly, the present invention relates to the apparatus, circuit, and method for controlling a service access using at least one of a service type and a service priority.

2. Description of the Related Art

A mobile communication system has evolved to provide various high-speed large-capacity services to User Equipments (UEs). Examples of the mobile communication system include a High Speed Downlink Packet Access (HSDPA) mobile communication system, a High Speed Uplink Packet Access (HSUPA) mobile communication system, a Long-Term Evolution (LTE) mobile communication system, an LTE-Advanced (LTE-A) mobile communication system, a High Rate Packet Data (HRPD) mobile communication system proposed in a 3rd Generation Project Partnership 2 (3GPP2), and an Institute of Electrical and Electronics Engineers (IEEE) 802.16m mobile communication system.

The LTE mobile communication system has been developed to effectively support a high-speed radio packet data transmission, and maximizes a throughput of a cellular radio communication system using various Radio Access (RA) schemes. The LTE-A mobile communication system enhances the LTE mobile communication system, and has an enhanced transmission capability compared with the LTE mobile communication system.

The LTE mobile communication system only supports packet data calls except for voice calls which have been supported in mobile communication systems of the related art, so, in the LTE mobile communication system, various schemes for supporting the voice calls have been developed. Typical examples of the various schemes for supporting the voice calls are a Packet Service Voice Call (PS Voice Call) scheme, a Voice over IP (VoIP) scheme, a Voice over LTE (VoLTE) scheme, a Single Radio Voice Call Continuity (SRVCC) scheme, etc. Each of the PS Voice Call scheme, the VoIP scheme, and the VoLTE scheme is a scheme in which a voice call is converted into packet data, and the converted packet data is transmitted. The SRVCC scheme is a scheme in which a voice call may be converted into packet data, and the converted packet data may be transmitted in a case that a UE has performed a Radio Access Technology (RAT) Inter-RAT Handover (I-RAT Handover) operation from a 3GPP network to another network different from the 3GPP network.

In the LTE mobile communication system, another scheme for supporting a voice call service, such as a Circuit Service FallBack (CSFB) scheme for using a voice call service used in a mobile communication system which supports each of a Packet Service (PS) and a Circuit Service (CS) such as a Universal Mobile Telecommunication system (UMTS), has been proposed. The CSFB scheme is a scheme in which a voice network of the related art is used until networks consisting of only packet data are stably served.

In an LTE mobile communication system, an evolved Node B (eNB) controls access to the eNB of UEs, and more specially controls the accesses to the eNB of the UEs using an Access Barring parameter. The Access Barring parameter is transmitted through a System Information Block (SIB) Type 2 (SIB Type2) message.

However, an access control scheme of a UE used in an LTE mobile communication system, i.e., a scheme in which an eNB controls a service access of the UE to the eNB using the Access Barring parameter, does not consider a service type and a service priority of a service which the UE intends to receive. So, it can be difficult to provide a service with a desired service quality for the UE. Therefore, there is a need for a service access control scheme for considering the service type and the service priority of the service which the UE intends to receive.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to propose an apparatus, circuit, and method for controlling a service access in a packet data communication system.

Another aspect of the present invention is to propose an apparatus, circuit, and method for controlling a service access by considering at least one of a service type and a service priority in a packet data communication system.

Another aspect of the present invention is to propose an apparatus, circuit, and method for controlling a service access by considering a service characteristic in a packet data communication system.

In accordance with an aspect of the present invention, a method for controlling a service access by an evolved Node B (eNB) in a packet data communication system is provided. The method includes broadcasting information related to whether a service access to a specific service is possible.

In accordance with another aspect of the present invention, a method for controlling a service access by an eNB in a packet data communication system is provided. The method includes broadcasting information related to whether a service access to a related service is possible by considering at least one of a service characteristic, a service type, and a service priority of each of services which the eNB may provide.

In accordance with yet another aspect of the present invention, a method for controlling a service access by a User Equipment (UE) in a packet data communication system is provided. The method includes receiving information related to whether a service access to a specific service is possible from an eNB.

In accordance with still another aspect of the present invention, a method for controlling a service access by a UE in a packet data communication system is provided. The method includes receiving information related to whether a service access to a related service is possible by considering at least one of a service characteristic, a service type, and a service priority of each of services which an eNB may provide.

In accordance with yet still another aspect of the present invention, an eNB in a packet data communication system is provided. The eNB includes a transmitter for broadcasting information related to whether a service access to a specific service is possible.

In accordance with still yet another aspect of the present invention, an eNB in a packet data communication system is provided. The eNB includes a transmitter for broadcasting information related to whether a service access to a related service is possible by considering at least one of a service characteristic, a service type, and a service priority of each of services which the eNB may provide.

In accordance with even yet another aspect of the present invention, a UE in a packet data communication system is provided. The UE includes a receiver for receiving information related to whether a service access to a specific service is possible from an eNB.

In accordance with even still another aspect of the present invention, a UE in a packet data communication system is provided. The UE includes a receiver for receiving information related to whether a service access to a related service is possible by considering at least one of a service characteristic, a service type, and a service priority of each of services which an eNB may provide.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary embodiment of the present invention provides an apparatus, circuit, and method for controlling a service access in a packet data communication system.

An exemplary embodiment of the present invention provides an apparatus, circuit, and method for controlling a service access by considering at least one of a service type and a service priority in a packet data communication system.

An exemplary embodiment of the present invention provides an apparatus, circuit, and method for controlling a service access by considering a service characteristic in a packet data communication system.

Exemplary embodiments of the present invention are described below with reference to a Long Term Evolution (LTE) mobile communication system. However, it will be understood by those of ordinary skill in the art that exemplary embodiments of the present invention may be applied to other packet data communication systems such as a Long Term Evolution Advanced (LTE-A) mobile communication system, a High Speed Uplink Packet Access (HSUPA) mobile communication system, and a High Rate Packet Data (HRPD) mobile communication system proposed in a 3rd Generation Project Partnership 2 (3GPP2).

Exemplary embodiments of the present invention are described below with reference to a Packet Service (PS) Voice Call (PS Voice Call) access. However, it will be understood by those of ordinary skill in the art that exemplary embodiments of the present invention may be applied to other service access.

Figure 1:
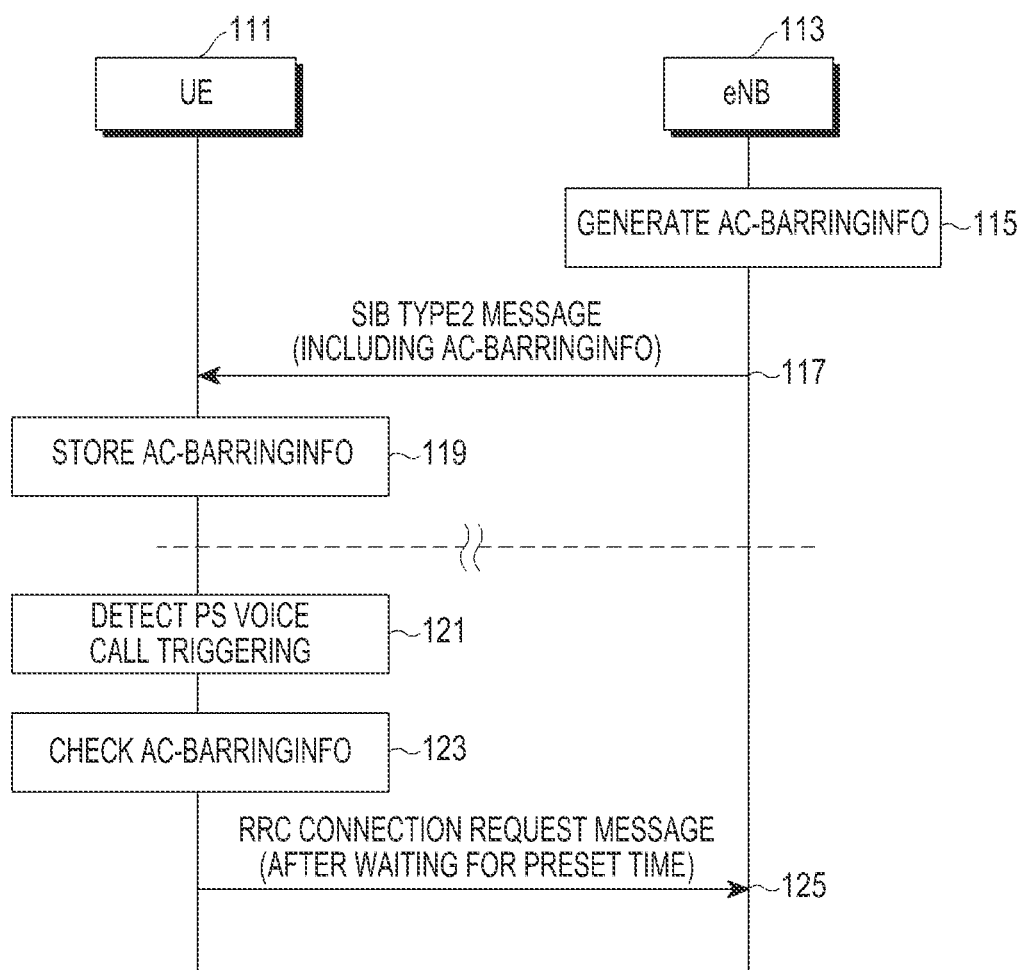
FIG. 1 illustrates a process for controlling a Packet Service (PS) Voice Call access in a Long Term Evolution (LTE) mobile communication system according to a first exemplary embodiment of the present invention.

FIG. 1 illustrates a process for controlling a PS Voice Call access in an LTE mobile communication system according to a first exemplary embodiment of the present invention.

Referring to FIG. 1, an evolved Node B (eNB) 113 generates access Barring Information (ac-BarringInfo) upon determining that there is a need for a service access barring by considering system parameters in step 115. The ac-BarringInfo indicates information on a service access which the eNB 113 intends to bar, and includes at least one of an access Barring For Emergency (ac-BarringForEmergency) parameter indicating service access barring for an emergency service, an access Barring For Mobile Originating-Signalling (ac-BarringForMo-Signalling) parameter indicating service access barring for Mobile Originating (MO)-signalling, an access Barring For Mobile Originating-Data (ac-BarringForMo-Data) parameter indicating service access barring for an MO-data, and an access Barring For Circuit Service FallBack (CSFB)-Release 10 (ac-BarringForCSFB-r10) parameter indicating service access barring for a CSFB-Release 10.

The ac-BarringInfo is processed in a Radio Resource Control (RRC) layer. In FIG. 1, it will be assumed that the ac-BarringInfo includes all of the ac-BarringForEmergency parameter, the ac-BarringForMo-Signalling parameter, the ac-BarringForMo-Data parameter, and the ac-BarringForCSFB-r10 parameter.

Each of the ac-BarringForEmergency parameter, the ac-BarringForMo-Signalling parameter, the ac-BarringForMo-Data parameter, and the ac-BarringForCSFB-r10 parameter may indicate related service access barring if each of the ac-BarringForEmergency parameter, the ac-BarringForMo-Signalling parameter, the ac-BarringForMo-Data parameter, and the ac-BarringForCSFB-r10 parameter is included in the ac-BarringInfo. On the other hand, each of the ac-BarringForEmergency parameter, the ac-BarringForMo-Signalling parameter, the ac-BarringForMo-Data parameter, and the ac-BarringForCSFB-r10 parameter may indicate the related service access barring according to a parameter value of each of the ac-BarringForEmergency parameter, the ac-BarringForMo-Signalling parameter, the ac-BarringForMo-Data parameter, and the ac-BarringForCSFB-r10 parameter.

The detailed description of the ac-BarringForEmergency parameter, the ac-BarringForMo-Signalling parameter, the ac-BarringForMo-Data parameter, and the ac-BarringForCSFB-r10 parameter will follow.

In an LTE mobile communication system, the ac-BarringForEmergency parameter, the ac-BarringForMo-Signalling parameter, the ac-BarringForMo-Data parameter, and the ac-BarringForCSFB-r10 parameter may be included in the ac-BarringInfo, and the ac-BarringInfo may be transmitted through a System Information Block (SIB) Type 2 (SIB Type2) message. The ac-BarringForEmergency parameter, the ac-BarringForMo-Signalling parameter, and the ac-BarringForMo-Data parameter have been added in a standard prior to an LTE-A Release 10 standard, and the ac-BarringForCSFB-r10 parameter has been added in the LTE-A Release 10 standard.

The ac-BarringForEmergency parameter should always be included in the ac-BarringInfo, and indicates whether a related eNB bars a service access to an emergency call using two values, e.g., "TRUE" and "FALSE". If the value of the ac-BarringForEmergency parameter is set to "TRUE", the ac-BarringForEmergency parameter indicates the related eNB bars the service access to the emergency call. If the value of the ac-BarringForEmergency parameter is set to "FALSE", the ac-BarringForEmergency parameter indicates the related eNB does not bar the service access to the emergency call.

Each of the ac-BarringForMO-Signalling parameter, the ac-BarringForMO-Data parameter, and the ac-BarringForCSFB-r10 parameter includes the following parameters.

(1) ac-BarringFactor Parameter

The ac-BarringFactor parameter denotes an access barring ration for a related service. The ac-BarringFactor parameter may have one value representing a barring percentage from among 0 to 95. If a value of the ac-BarringFactor parameter is 0, the ac-BarringFactor parameter indicates that a service access to a related service is always allowed, i.e., 0% of the related service is barred. If the value of the ac-BarringFactor parameter is 95, the ac-BarringFactor parameter indicates that the service access to the related service is barred to 95%.

(2) ac-BarringTime Parameter

The ac-BarringTime parameter denotes access barring time for a related service. For example, the ac-BarringTime parameter may indicate one value from among 4 to 512 seconds if a service access to the related service is barred. In this case, a User Equipment (UE) does not perform a service access to a related cell, i.e., a related service corresponding to a value of the ac-BarringTime parameter.

(3) ac-BarringForSpecialAC Parameter

The ac-BarringForSpecialAC parameter denotes service access barring for a specific access. For example, a service access to a related service is barred if all of information of special AC 11 . . . 15 stored in a Universal Subscriber Identity Module (USIM) of a UE and a value of an AC-BarringConfig parameter received through the SIB Type2 message are set to "1".

For example, if a UE receives the ac-BarringForEmergency parameter, the ac-BarringForMo-Signalling parameter, the ac-BarringForMo-Data parameter and the ac-BarringForCSFB-r10 parameter through the SIB Type2 message upon accessing an eNB, it will be assumed that the UE may detect access barring for a related service using a value of each of the ac-BarringForEmergency parameter, the ac-BarringForMo-Signalling parameter, the ac-BarringForMo-Data parameter and the ac-BarringForCSFB-r10 parameter.

The eNB 113 may bar a service access to the eNB 113 of UEs using an access Barring For MultiMedia TELephony-Voice-Release 9 (ssac-BarringForMMTEL-Voice-r9) parameter indicating a service access barring for multimedia telephony-voice-Release 9 and an access Barring For MultiMedia TELephony-Video-Release 9 (ssac-BarringForMMTEL-Video-r9) parameter indicating a service access barring for multimedia telephony-video-Release 9. The ssac-BarringForMMTEL-Voice-r9 parameter and the ssac-BarringForMMTEL-Video-r9 parameter are processed in an upper layer, not a RRC layer, for example, a User Interface (UI) layer.

Each of the ssac-BarringForMMTEL-Voice-r9 parameter and the ssac-BarringForMMTEL-Video-r9 parameter may indicate related service access barring by transmitting/receiving the ssac-BarringForMMTEL-Voice-r9 parameter and the ssac-BarringForMMTEL-Video-r9 parameter. On the other hand, a value of each of the ssac-BarringForMMTEL-Voice-r9 parameter and the ssac-BarringForMMTEL-Video-r9 parameter may indicate the related service access barring. For example, if each of the ssac-BarringForMMTEL-Voice-r9 parameter and the ssac-BarringForMMTEL-Video-r9 parameter is implemented by 1 bit, it will be assumed that each of the ssac-BarringForMMTEL-Voice-r9 parameter and the ssac-BarringForMMTEL-Video-r9 parameter indicates the related service access barring only if a value of each of the ssac-BarringForMMTEL-Voice-r9 parameter and the ssac-BarringForMMTEL-Video-r9 parameter is "1".

In FIG. 1, for convenience, the eNB bars a service access for the eNB using ac-BarringInfo processed in a RRC layer.

The eNB 113 includes the generated ac-BarringInfo into System Information (SI), and broadcasts a SIB Type2 message including the SI including the ac-BarringInfo in order for UEs located in a service coverage area of the eNB 113 to receive the SIB Type2 message in step 117. In FIG. 1, the UE 111 receives the SIB Type2 message broadcast by the eNB 113, however, it will be understood by those of ordinary skill in the art that UEs which receive the SIB Type2 message may be all UEs located in the service coverage of the eNB 113.

The UE 111 receives the SIB Type2 message, detects the ac-BarringInfo from the SI included in the received SIB Type2 message, and stores the detected ac-BarringInfo in step 119.

The UE 111 detects that a PS Voice Call has been triggered in step 121. Upon detecting that the PS Voice Call has been triggered, the UE 111 determines whether the UE 111 may perform a service access to the eNB 113 for the PS Voice Call by checking the ac-BarringInfo in step 123. In FIG. 1, the UE 111 may detect that the service access to the eNB 113 is barring since the ac-BarringInfo includes the ac-BarringForMo-Data parameter.

According to detecting the service barring for the PS Voice Call, the UE 111 intends to service access the eNB 113 by transmitting a RRC Connection Request message to the eNB 113 after waiting for a preset time in step 125.

Figure 2:
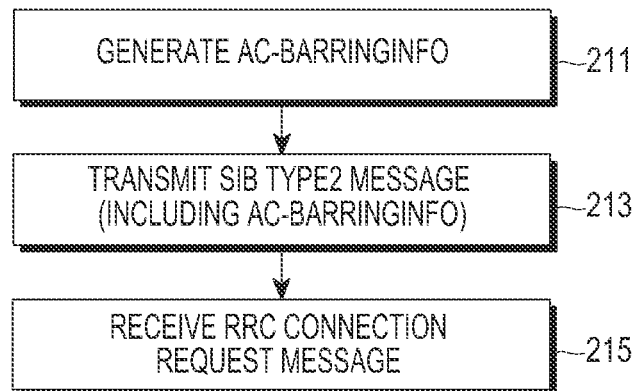
FIG. 2 illustrates an operation process of an evolved Node B (eNB), such as the eNB illustrated in FIG. 1, according to an exemplary embodiment of the present invention.

FIG. 2 illustrates an operation process of an eNB, such as the eNB 113 illustrated in FIG. 1, according to an exemplary embodiment of the present invention.

Referring to FIG. 2, the eNB 113 generates ac-BarringInfo upon determining that there is a need for service access barring by considering system parameters in step 211. The ac-BarringInfo is described before with reference to FIG. 1, so a detailed description thereof will be omitted here. The eNB 113 includes the generated ac-BarringInfo into SI, and broadcasts an SIB Type2 message including the SI including the ac-BarringInfo in order for UEs (including a UE 111) located in a service coverage area of the eNB 113 to receive the SIB Type2 message in step 213. The eNB 113 receives a RRC Connection Request message from the UE 111 in step 215. It is noted that the UE 111 transmits the RRC Connection Request message after waiting for a preset time according to the service access barring of the eNB 113.

Figure 3:
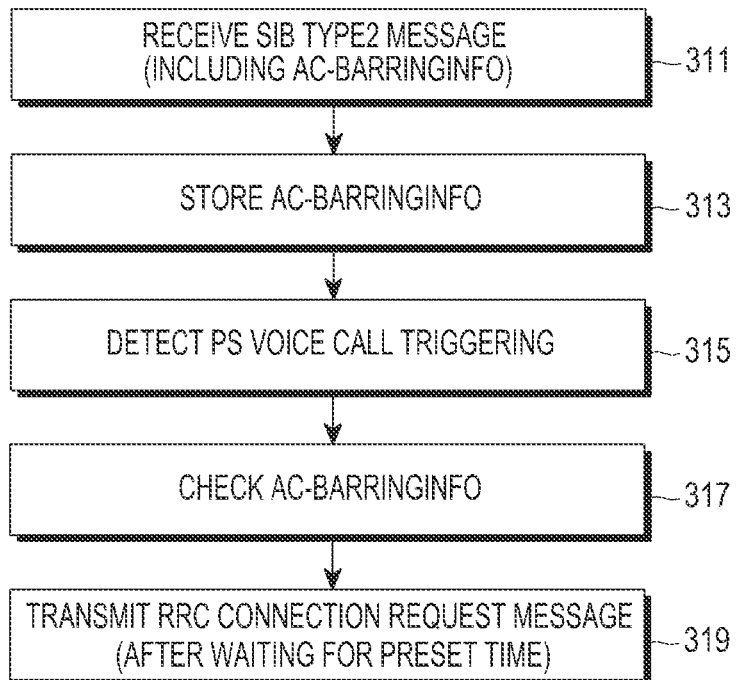
FIG. 3 illustrates an operation process of a User Equipment (UE), such as the UE illustrated in FIG. 1, according to an exemplary embodiment of the present invention.

FIG. 3 illustrates an operation process of a UE, such as the UE 111 illustrated in FIG. 1, according to an exemplary embodiment of the present invention.

Referring to FIG. 3, the UE 111 receives an SIB Type2 message including SI including ac-BarringInfo from eNB 113 in step 311. The UE 111 detects the ac-BarringInfo from the SI included in the SIB Type2 message and stores the ac-BarringInfo in step 313. The UE 111 detects that a PS Voice Call is triggered in step 315. The UE 111 determines whether the UE 111 may perform a service access to the eNB 113 for the PS Voice Call by checking the stored ac-BarringInfo in step 317. In FIG. 1, it will be assumed that the ac-BarringInfo includes the ac-BarringForMo-Data parameter, so the UE 111 may detect that the service access to the eNB 113 is barring.

The UE 111 transmits a RRC Connection message for the PS Voice Call to the eNB 113 after waiting for a preset time without transmitting the RRC Connection message for the PS Voice Call due to the service access barring in step 319.

As described with regard to FIGS. 1 to 3, in an LTE mobile communication system, a specific eNB may bar a service access to the specific eNB using an ac-BarringInfo.

Meanwhile, whether a voice call service is possible is very important for a user using a UE, so a mobile communication provider gives the highest service priority to the voice call service by considering importance of the voice call service. That is, the user may receive the voice call service anytime and anywhere.

In an LTE mobile communication system, if an eNB controls to service access the eNB using ac-BarringInfo including an ac-BarringForMo-Data parameter, a voice call service becomes a service access barring object for the eNB due to the ac-BarringForMo-Data parameter, because the voice call service is provided as a packet data service, that is, the voice call service is provided through packet data. For example, in the LTE mobile communication system, if the eNB controls to service access the eNB using a scheme described in FIGS. 1 to 3, a voice call service may not be provided to a UE during an access barring interval.

Exemplary embodiments of the present invention further provide an apparatus, circuit, and method for controlling a service access using a new parameter, i.e., an Access Enable For PS Voice Call (AccessEnableForPSCall) parameter indicating that a service access to a PS Voice Call is possible in an LTE mobile communication system. The AccessEnableForPSCall parameter may be included in the ac-BarringInfo.

Figure 4:
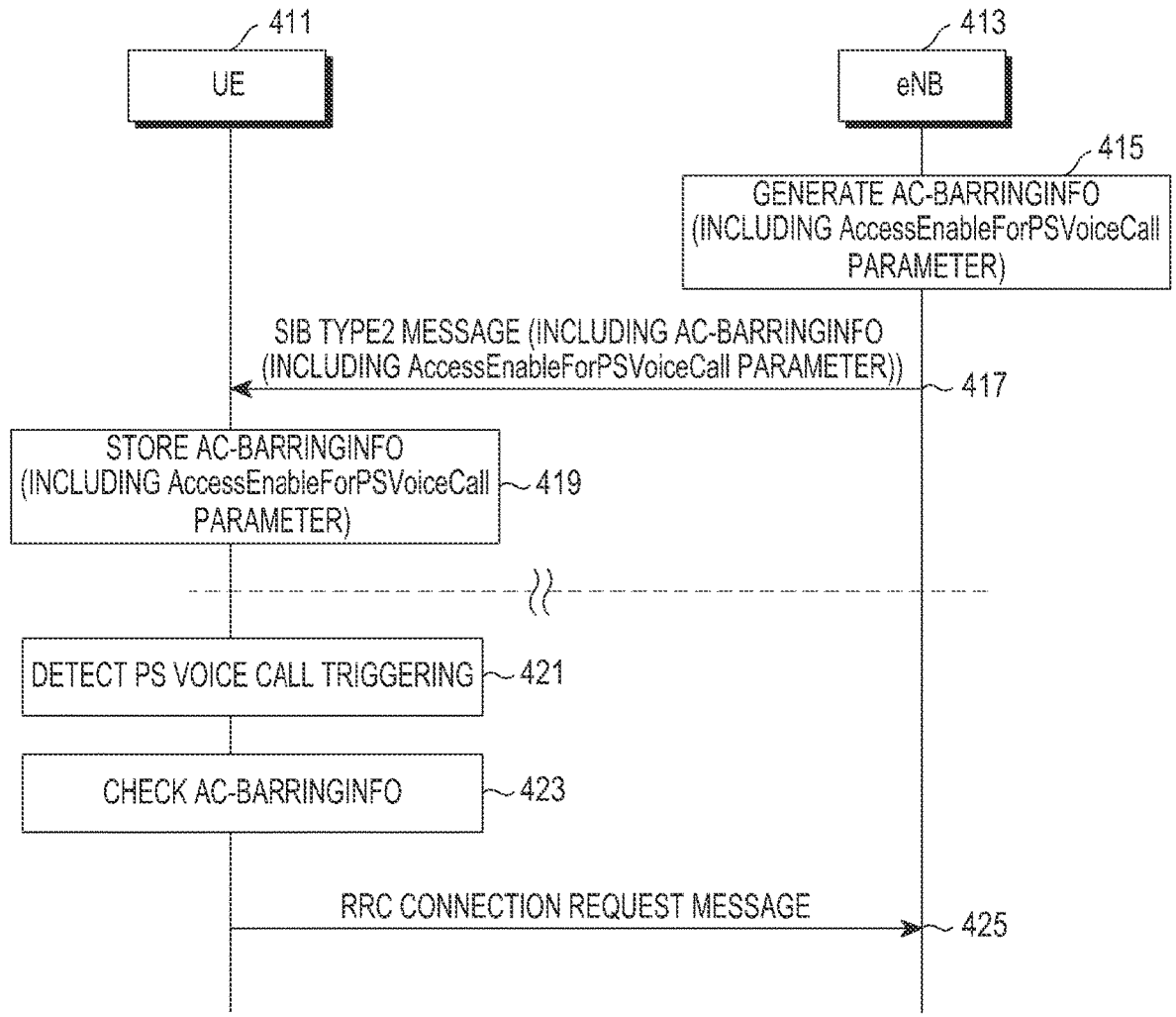
FIG. 4 illustrates a process for controlling a PS Voice Call access in an LTE mobile communication system according to a second exemplary embodiment of the present invention.

FIG. 4 schematically illustrates a process for controlling a PS Voice Call access in an LTE mobile communication system according to a second exemplary embodiment of the present invention.

Referring to FIG. 4, an eNB 413 generates ac-BarringInfo upon determining that there is a need for service access barring by considering system parameters in step 415. The ac-BarringInfo indicates information on a service access which the eNB 413 intends to bar, and includes at least one of an ac-BarringForEmergency parameter, an ac-BarringForMo-Signalling parameter, an ac-BarringForMo-Data parameter, an ac-BarringForCSFB-r10 parameter, and an AccessEnableForPSCall parameter. The BarringInfo is processed in a RRC layer. In FIG. 4, it will be assumed that the ac-BarringInfo includes all of the ac-BarringForEmergency parameter, the ac-BarringForMo-Signalling parameter, the ac-BarringForMo-Data parameter, the ac-BarringForCSFB-r10 parameter, and the AccessEnableForPSCall parameter.

Each of the ac-BarringForEmergency parameter, the ac-BarringForMo-Signalling parameter, the ac-BarringForMo-Data parameter, the ac-BarringForCSFB-r10, and the AccessEnableForPSCall parameter may indicate related service access barring if each of the ac-BarringForEmergency parameter, the ac-BarringForMo-Signalling parameter, the ac-BarringForMo-Data parameter, the ac-BarringForCSFB-r10 parameter, and the AccessEnableForPSCall parameter is included in the ac-BarringInfo. On the other hand, each of the ac-BarringForEmergency parameter, the ac-BarringForMo-Signalling parameter, the ac-BarringForMo-Data parameter, the ac-BarringForCSFB-r10 parameter, and the AccessEnableForPSCall parameter may indicate the related service access barring according to a parameter value of each of the ac-BarringForEmergency parameter, the ac-BarringForMo-Signalling parameter, the ac-BarringForMo-Data parameter, the ac-BarringForCSFB-r10 parameter, and the AccessEnableForPSCall parameter. For example, in a case that each of the ac-BarringForEmergency parameter, the ac-BarringForMo-Signalling parameter, the ac-BarringForMo-Data parameter, the ac-BarringForCSFB-r10 parameter, and the AccessEnableForPSCall parameter is implemented by 1 bit, it will be assumed that a related parameter indicates the service access barring for the related service only if a parameter value of a related parameter is '1'.

The eNB 413 may bar a service access to the eNB of UEs using an ssac-BarringForMMTEL-Voice-r9 parameter and an ssac-BarringForMMTEL-Video-r9 parameter processed in an upper layer, not the RRC layer, e.g., a User Interface (UI) layer.

Each of the ssac-BarringForMMTEL-Voice-r9 parameter and the ssac-BarringForMMTEL-Video-r9 parameter may indicate related service access barring if each of the ssac-BarringForMMTEL-Voice-r9 parameter and the ssac-BarringForMMTEL-Video-r9 parameter is included in the ac-BarringInfo. On the other hand, each of the ssac-BarringForMMTEL-Voice-r9 parameter and the ssac-BarringForMMTEL-Video-r9 parameter may indicate the related service access barring according to a parameter value of each of the ssac-BarringForMMTEL-Voice-r9 parameter, and the ssac-BarringForMMTEL-Video-r9 parameter. For example, in a case that each of the ssac-BarringForMMTEL-Voice-r9 parameter and the ssac-BarringForMMTEL-Video-r9 parameter is implemented by 1 bit, it will be assumed that a related parameter indicates service access barring for a related service only if a parameter value of the related parameter is '1'.

In FIG. 4, for convenience, the eNB bars a service access for the eNB using ac-BarringInfo processed in a RRC layer.

The eNB 413 includes the generated ac-BarringInfo into SI, and broadcasts an SIB Type2 message including the SI including the ac-BarringInfo in order for UEs located in a service coverage area of the eNB 413 to receive the SIB Type2 message in step 417. In FIG. 4, the UE 411 receives the SIB Type2 message broadcast by the eNB 413. However, it will be understood by those of ordinary skill in the art that UEs which receive the SIB Type2 message may be all UEs located in the service coverage area of the eNB 413.

The UE 411 receives the SIB Type2 message, detects the ac-BarringInfo from the SI included in the received SIB Type2 message, and stores the detected ac-BarringInfo in step 419.

The UE 411 detects that a PS Voice Call is triggered in step 421. Upon detecting that the PS Voice Call is triggered, the UE 411 determines whether the UE 411 may perform a service access to the eNB 413 for the PS Voice Call by checking the ac-BarringInfo in step 423. In FIG. 4, the UE 411 may detect that a service access to the PS Voice Call is possible even though a service access to the eNB 413 is barring since the ac-BarringInfo includes the ac-BarringForMo-Data parameter and the AccessEnableForPSCall parameter.

According to detecting that the service access to the PS Voice Call is possible, the UE 411 intends to service access the eNB 413 by transmitting a RRC Connection Request message to the eNB 413 in step 425.

Figure 5:
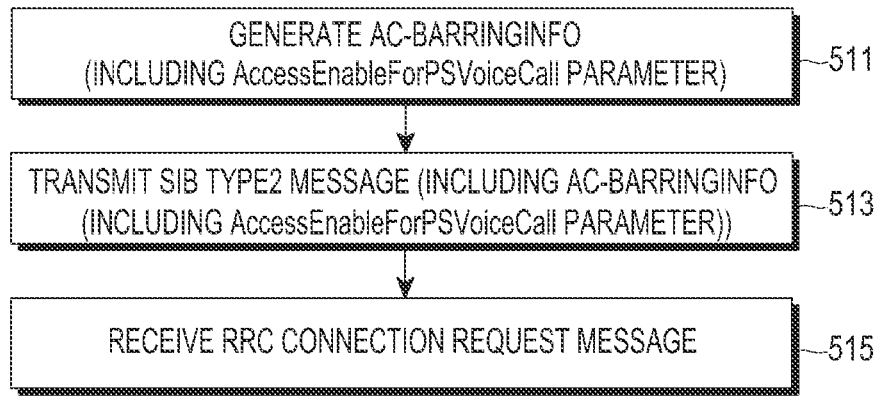
FIG. 5 illustrates an operation process of an eNB, such as the eNB illustrated in FIG. 4, according to an exemplary embodiment of the present invention.

FIG. 5 illustrates an operation process of an eNB, such as the eNB 413 illustrated in FIG. 4, according to an exemplary embodiment of the present invention.

Referring to FIG. 5, the eNB 413 generates ac-BarringInfo upon determining that there is a need for service access barring by considering system parameters in step 511. The ac-BarringInfo is described before with reference to FIG. 4, so a detailed description thereof will be omitted here. The eNB 413 includes the generated ac-BarringInfo into SI, and broadcasts an SIB Type2 message including the SI including the ac-BarringInfo, specially an AccessEnableForPSCall parameter in order for UEs (including a UE 411) located in a service coverage of the eNB 413 to receive the SIB Type2 message in step 513. The eNB 413 receives a RRC Connection Request message from the UE 411 in step 515. It is noted that the UE 411 immediately transmits the RRC Connection Request message to the eNB 413 without service access barring by detecting the AccessEnableForPSCall parameter.

Figure 6:
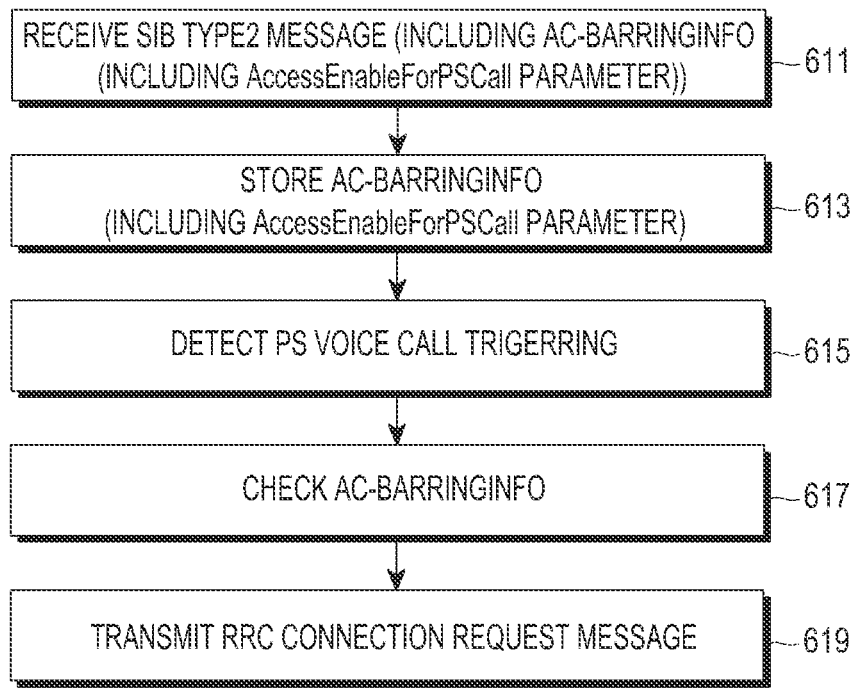
FIG. 6 illustrates an operation process of a UE, such as the UE illustrated in FIG. 4, according to an exemplary embodiment of the present invention.

FIG. 6 illustrates an operation process of a UE, such as the UE 411 illustrated in FIG. 4, according to an exemplary embodiment of the present invention.

Referring to FIG. 6, the UE 411 receives an SIB Type2 message including SI including ac-BarringInfo including an AccessEnableForPSCall parameter from eNB 413 in step 611. The UE 411 detects the ac-BarringInfo including the AccessEnableForPSCall parameter from the SI included in the SIB Type2 message and stores the ac-BarringInfo in step 613. The UE 411 detects that a PS Voice Call is triggered in step 615. The UE 411 determines whether the UE 411 may perform a service access to the eNB 113 for the PS Voice Call by checking the stored ac-BarringInfo in step 617. In FIG. 4, it will be assumed that the ac-BarringInfo includes the ac-BarringForMo-Data parameter and the AccessEnableForPSCall parameter, so the UE 411 may detect that the service access to the eNB 413 is possible. So, the UE 411 transmits a RRC Connection message for the PS Voice Call to the eNB 413 since the service access to the eNB 413 is possible in step 619.

As described with regard to FIGS. 4 to 6, in an LTE mobile communication system, an eNB may provide a voice call service by including the AccessEnableForPSCall parameter into the ac-BarringInfo.

Referring to FIGS. 4 to 6, a service type of a service which is always possible to service access in a case that a service access to a specific eNB is barred in an LTE mobile communication system is a voice call service. However, it will be understood by those of ordinary skill in the art that a service access control process described in FIGS. 4 to 6 may be applied to other service different from the voice call service.

Further, it will be understood by those of ordinary skill in the art that the service type of the service which is always possible to service access in the case that the service access to the specific eNB is barred in the LTE mobile communication system may not be limited, and may, for example, be one of a real-time service such as the voice call service, a service that a UE will always want to receive, a service which is set to always serve in the LTE mobile communication system, a service which is provided to a UE which uses the highest billing rate, etc. That is, the service type of the service which is always possible to service access in the case that the service access to the specific eNB is barred in the LTE mobile communication system may be determined by considering a service type, a service priority, etc.

In FIGS. 4 to 6, a service access to a specific eNB is controlled by facilitating a service access to a voice call service in the case that the service access to the specific eNB is barred in the LTE mobile communication system. However, it will be understood by those of ordinary skill in the art that a service access may be controlled per a service, and a service characteristic without limiting a service access based on whether a service is the voice call service.

The detailed description of a method for controlling a service access using a service characteristic will follow.

Each of services has a related service characteristic. For example, the related service characteristic may include data transmission capacity, response/delay speed, data reliability, and a real-time communication characteristic such as a voice, a video conference, and a video call. So, an eNB may control a service access based on the service characteristic. That is, the eNB may control a service access according to a service characteristic of a related service regardless of a type of a service which a UE wants to receive.

For example, an eNB always allows a service access if a service characteristic has a real-time communication characteristic regardless of a service type. On the other hand, the eNB bars the service access if the service characteristic does not have the real-time communication characteristic regardless of the service type. The eNB always allows the service access if the service characteristic indicates a response/delay speed is less than a preset threshold response/delay speed regardless of the service type. On the other hand, the eNB bars the service access if the service characteristic does not indicate the response/delay speed is equal to or greater than the threshold response/delay speed regardless of the service type. Further, the eNB always allows the service access if a data transmitting capacity is less than a preset threshold data transmitting capacity regardless of the service type. On the other hand, the eNB bars the service access if the data transmitting capacity is equal to or greater than the threshold data transmitting capacity regardless of the service type.

That is, the eNB may bar or allow a service access on a basis of a service characteristic including data transmission capacity, response/delay speed, data reliability, and a real-time communication characteristic such as a voice, a video conference, and a video call.

In FIGS. 4 to 6, in an LTE mobile communication system, a specific eNB allows a service access to a voice call service even though a service access to the specific eNB is barring. However, it will be understood by those of ordinary skill in the art that exemplary embodiments of the present invention may bar a service access by including a voice call service, i.e., a PS Voice Call into Mobile Originating (MO) data.

Exemplary embodiments of the present invention further provide an apparatus, circuit, and method for controlling a service access using an AccessEnableGroup parameter indicating an Access Enable Group (AccessEnableGroup) as a group of UEs which may service access under a service access barring situation in an LTE mobile communication system. The AccessEnableGroup parameter includes IDentifiers (IDs) of UEs included in an AccessEnableGroup. The AccessEnableGroup parameter may be included in the ac-BarringInfo.

Figure 7:
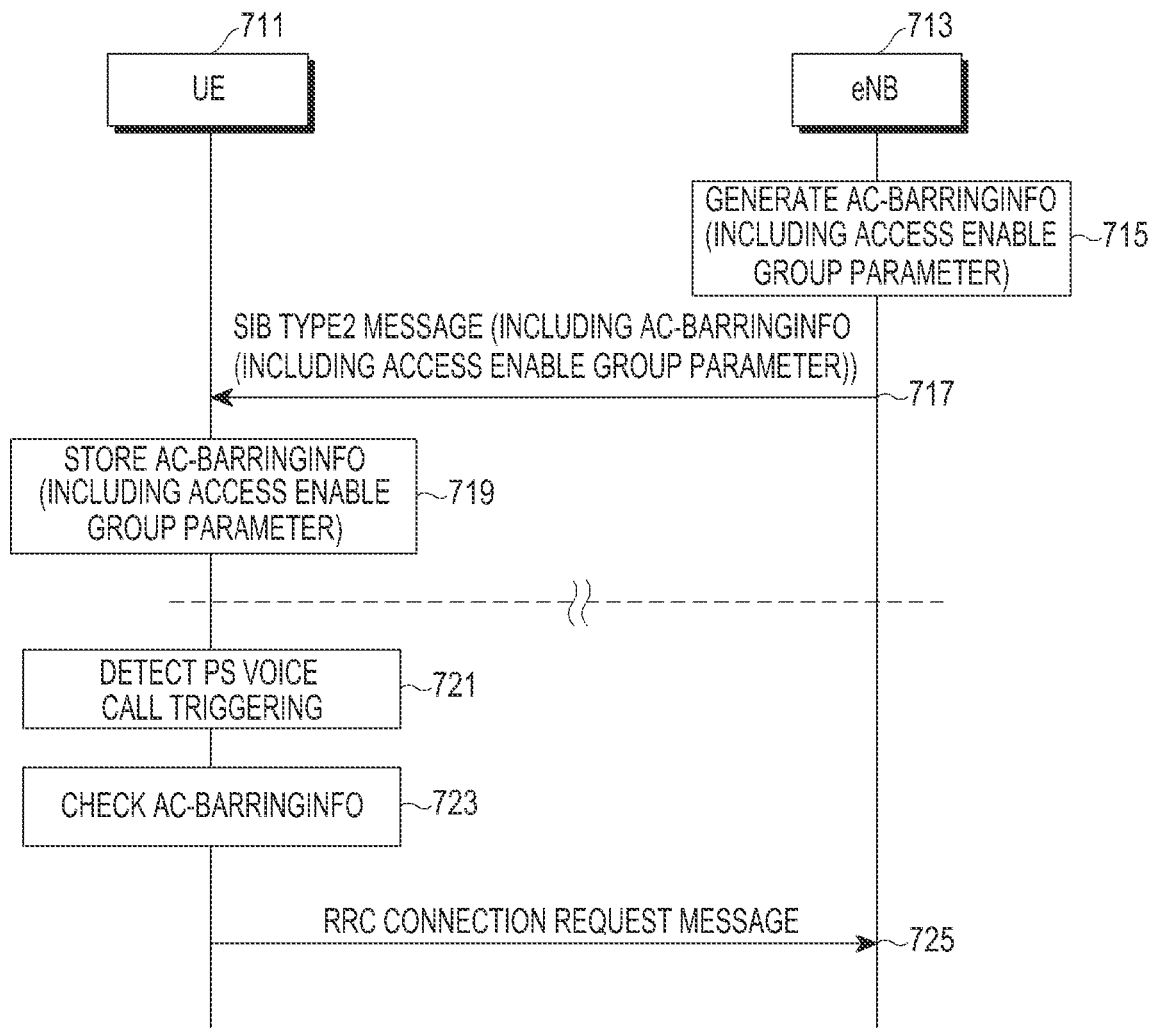
FIG. 7 illustrates a process for controlling a PS Voice Call access in an LTE mobile communication system according to a third exemplary embodiment of the present invention.

FIG. 7 illustrates a process for controlling a PS Voice Call access in an LTE mobile communication system according to a third exemplary embodiment of the present invention.

Referring to FIG. 7, an eNB 713 generates ac-BarringInfo upon determining that there is a need for service access barring by considering system parameters in step 715. The ac-BarringInfo indicates information on a service access which the eNB 713 intends to bar, and includes at least one of an ac-BarringForEmergency parameter, an ac-BarringForMo-Signalling parameter, an ac-BarringForMo-Data parameter, an ac-BarringForCSFB-r10 parameter, and an Access Enable Group parameter. The ac-BarringInfo is processed in a RRC layer. In FIG. 7, it will be assumed that the ac-BarringInfo includes all of the ac-BarringForEmergency parameter, the ac-BarringForMo-Signalling parameter, the ac-BarringForMo-Data parameter, the ac-BarringForCSFB-r10 parameter, and the Access Enable Group parameter. In FIG. 7, it will be further assumed that the Access Enable Group parameter includes an ID of the UE 711.

Each of the ac-BarringForEmergency parameter, the ac-BarringForMo-Signalling parameter, the ac-BarringForMo-Data parameter, and the ac-BarringForCSFB-r10 may indicate related service access barring if each of the ac-BarringForEmergency parameter, the ac-BarringForMo-Signalling parameter, the ac-BarringForMo-Data parameter, and the ac-BarringForCSFB-r10 parameter is included in the ac-BarringInfo. On the other hand, each of the ac-BarringForEmergency parameter, the ac-BarringForMo-Signalling parameter, the ac-BarringForMo-Data parameter, and the ac-BarringForCSFB-r10 parameter may indicate the related service access barring according to a parameter value of each of the ac-BarringForEmergency parameter, the ac-BarringForMo-Signalling parameter, the ac-BarringForMo-Data parameter, and the ac-BarringForCSFB-r10 parameter. For example, in a case that each of the ac-BarringForEmergency parameter, the ac-BarringForMo-Signalling parameter, the ac-BarringForMo-Data parameter, and the ac-BarringForCSFB-r10 parameter is implemented by 1 bit, it will be assumed that a related parameter indicates the service access barring for the related service only if a parameter value of the related parameter is '1'.

The eNB 713 may bar a service access to the eNB of UEs using an ssac-BarringForMMTEL-Voice-r9 parameter and an ssac-BarringForMMTEL-Video-r9 parameter processed in an upper layer not the RRC layer, e.g., a UI layer.

Each of the ssac-BarringForMMTEL-Voice-r9 parameter, and the ssac-BarringForMMTEL-Video-r9 parameter may indicate related service access barring if each of the ssac-BarringForMMTEL-Voice-r9 parameter, and the ssac-BarringForMMTEL-Video-r9 parameter is included in the ac-BarringInfo. On the other hand, each of the ssac-BarringForMMTEL-Voice-r9 parameter, and the ssac-BarringForMMTEL-Video-r9 parameter may indicate the related service access barring according to a parameter value of each of the ssac-BarringForMMTEL-Voice-r9 parameter, and the ssac-BarringForMMTEL-Video-r9 parameter. For example, in a case that each of the ssac-BarringForMMTEL-Voice-r9 parameter, and the ssac-BarringForMMTEL-Video-r9 parameter is implemented by 1 bit, it will be assumed that a related parameter indicates the service access barring for the related service only if a parameter value of the related parameter is '1'.

In FIG. 7, for convenience, the eNB bars a service access for the eNB using ac-BarringInfo processed in a RRC layer.

The eNB 713 includes the generated ac-BarringInfo into SI, and broadcasts an SIB Type2 message including the SI including the ac-BarringInfo in order for UEs located in a service coverage area of the eNB 713 to receive the SIB Type2 message in step 717. In FIG. 7, the UE 711 receives the SIB Type2 message broadcasted by the eNB 713, however, it will be understood by those of ordinary skill in the art that UEs which receive the SIB Type2 message may be all UEs located in the service coverage area of the eNB 713.

The UE 711 receives the SIB Type2 message, detects the ac-BarringInfo from the SI included in the received SIB Type2 message, and stores the detected ac-BarringInfo in step 719.

The UE 711 detects that a PS Voice Call is triggered in step 721. Upon detecting that the PS Voice Call is triggered, the UE 711 determines whether the UE 711 may perform a service access to the eNB 713 for the PS Voice Call by checking the ac-BarringInfo in step 723. In FIG. 7, the UE 711 may detect that a service access to the eNB 713 is possible even though a service access to the eNB 713 is barring since the ac-BarringInfo includes the ac-BarringForMo-Data parameter and the Access Enable Group parameter, and the Access Enable Group parameter includes the ID of the UE 711.

According to detecting that the service access to the PS Voice Call is possible, the UE 711 intends to service access the eNB 713 by transmitting a RRC Connection Request message to the eNB 713 in step 725.

Figure 8:
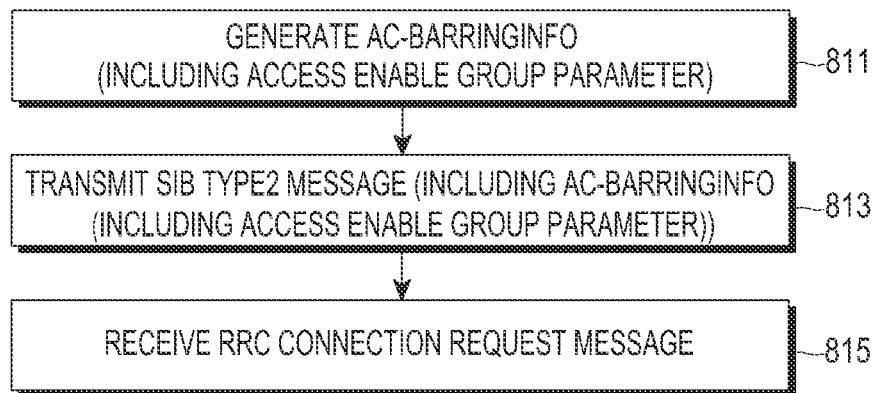
FIG. 8 illustrates an operation process of an eNB, such as the eNB illustrated in FIG. 7, according to an exemplary embodiment of the present invention.

FIG. 8 illustrates an operation process of an eNB, such as the eNB 713 illustrated in FIG. 7, according to an exemplary embodiment of the present invention.

Referring to FIG. 8, the eNB 713 generates ac-BarringInfo upon determining that there is a need for service access barring by considering system parameters in step 811. The ac-BarringInfo is described before with reference to FIG. 7, so a detailed description thereof will be omitted here. The eNB 713 includes the generated ac-BarringInfo into SI, and broadcasts an SIB Type2 message including the SI including the ac-BarringInfo, specially an Access Enable Group parameter in order for UEs (including a UE 711) located in a service coverage of the eNB 713 to receive the SIB Type2 message in step 813. The eNB 713 receives a RRC Connection Request message from the UE 711 in step 815. It is noted that the UE 711 immediately transmits the RRC Connection Request message to the eNB 713 without service access barring by detecting the Access Enable Group parameter.

Figure 9:
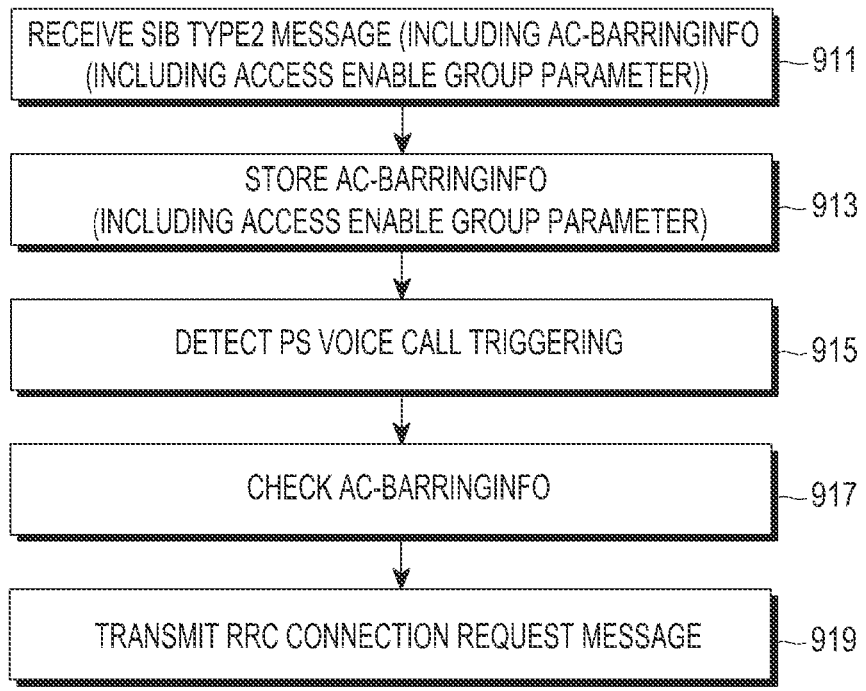
FIG. 9 illustrates an operation process of a UE, such as the UE illustrated in FIG. 7, according to an exemplary embodiment of the present invention.

FIG. 9 illustrates an operation process of a UE, such as the UE 711 illustrated in FIG. 7, according to an exemplary embodiment of the present invention.

Referring to FIG. 9, the UE 711 receives an SIB Type2 message including SI including ac-BarringInfo including an Access Enable Group parameter from eNB 713 in step 911. The UE 711 detects the ac-BarringInfo including the Access Enable Group parameter from the SI included in the SIB Type2 message and stores the ac-BarringInfo in step 913. The UE 711 detects that a PS Voice Call is triggered in step 915. The UE 711 determines whether the UE 711 may perform a service access to the eNB 713 for the PS Voice Call by checking the stored ac-BarringInfo in step 917. In FIG. 7, the ac-BarringInfo includes the ac-BarringForMo-Data parameter and the Access Enable Group parameter, so the UE 711 may detect that the service access to the eNB 713 is possible.

The UE 711 transmits a RRC Connection message for the PS Voice Call to the eNB 713 since the service access to the eNB 713 is possible in step 919.

As described with regard to FIGS. 7 to 9, in an LTE mobile communication system, an eNB may provide a voice call service by including the Access Enable Group parameter into the ac-BarringInfo anytime and anywhere.

In FIGS. 7 to 9, a service type of a service which is always possible to service access in a case that a service access to a specific eNB is barred in an LTE mobile communication system is a voice call service. However, it will be understood by those of ordinary skill in the art that a service access control process described in FIGS. 7 to 9 may be applied to other service different from the voice call service. The detailed description of the service type of the service which is always possible to service access in the case that the service access to the specific eNB is barred in the LTE mobile communication system will be omitted.

Unlike FIGS. 7 to 9, exemplary embodiments of the present invention further propose an apparatus, circuit, and method for controlling a service access using a Service Access Enable (ServiceAccessEnable) parameter indicating that a service which is always possible to service access in a case that a service access to a specific eNB is barred in an LTE mobile communication system.

In FIGS. 7 to 9, a service access to a specific eNB is controlled by facilitating a service access to a voice call service in the case that the service access to the specific eNB is barred in the LTE mobile communication system. However, it will be understood by those of ordinary skill in the art that a service access may be controlled per a service, and a service characteristic without limiting a service access based on whether a service is the voice call service.

The description of a method for controlling a service access using a service characteristic will follow.

Each of services has a service characteristic, and the service characteristic may include data transmitting capacity, response/delay speed, data reliability, and a real-time communication characteristic such as a voice, a video conference, and a video call. So, an eNB may control a service access based on the service characteristic. That is, the eNB may control a service access according to a service characteristic of a related service regardless of a service type of the related service which a UE intends to receive.

For example, an eNB always allows a service access if a service characteristic has a real-time communication characteristic regardless of a service type. On the other hand, the eNB bars the service access if the service characteristic does not have the real-time communication characteristic regardless of the service type. The eNB always allows the service access if the service characteristic indicates a response/delay speed is less than a preset threshold response/delay speed regardless of the service type. On the other hand, the eNB bars the service access if the service characteristic does not indicate the response/delay speed is equal to or greater than the threshold response/delay speed regardless of the service type. Further, the eNB always allows the service access if a data transmitting capacity is less than a preset threshold data transmitting capacity regardless of the service type. On the other hand, the eNB bars the service access if the data transmitting capacity is equal to or greater than the threshold data transmitting capacity regardless of the service type.

That is, the eNB may bar or allow a service access on a basis of a service characteristic including data transmission capacity, response/delay speed, data reliability, and a real-time communication characteristic such as a voice, a video conference, and a video call.

In FIGS. 7 to 9, a service access to a specific eNB is controlled by facilitating a service access to a voice call service in the case that the service access to the specific eNB is barred in the LTE mobile communication system. However, it will be understood by those of ordinary skill in the art that a service access may be barred by including a voice call service, i.e., a PS Voice Call into an MO data.

Figure 10:
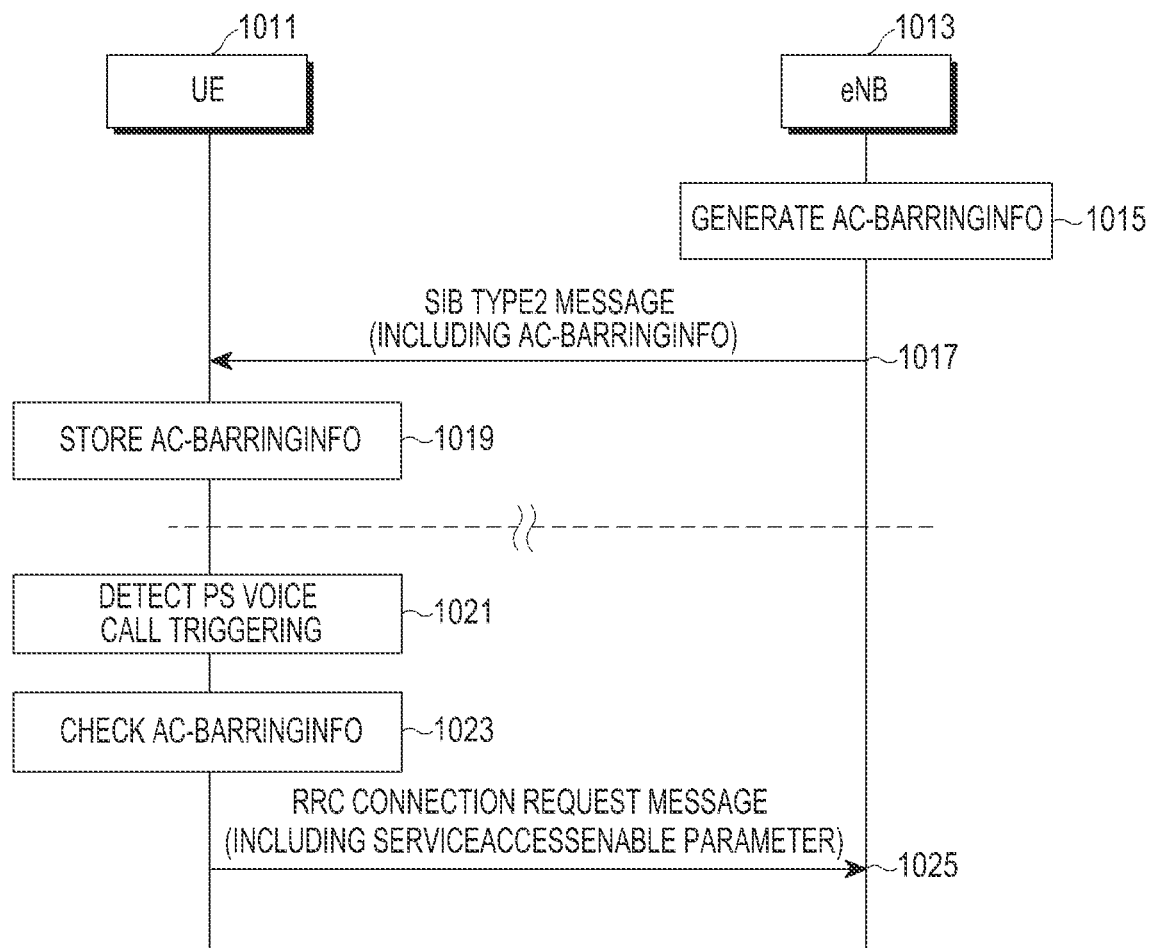
FIG. 10 illustrates a process for controlling a PS Voice Call access in an LTE mobile communication system according to a fourth exemplary embodiment of the present invention.

FIG. 10 illustrates a process for controlling a PS Voice Call access in an LTE mobile communication system according to a fourth exemplary embodiment of the present invention.

Referring to FIG. 10, an eNB 1013 generates ac-BarringInfo upon determining that there is a need for service access barring by considering system parameters in step 1015. The ac-BarringInfo indicates information on a service access which the eNB 1013 intends to bar, and includes at least one of an ac-BarringForEmergency parameter, an ac-BarringForMo-Signalling parameter, an ac-BarringForMo-Data parameter, and an ac-BarringForCSFB-r10 parameter. The ac-BarringInfo is processed in a RRC layer. In FIG. 10, it will be assumed that the ac-BarringInfo includes all of the ac-BarringForEmergency parameter, the ac-BarringForMo-Signalling parameter, the ac-BarringForMo-Data parameter, and the ac-BarringForCSFB-r10 parameter.

Each of the ac-BarringForEmergency parameter, the ac-BarringForMo-Signalling parameter, the ac-BarringForMo-Data parameter, and the ac-BarringForCSFB-r10 may indicate related service access barring if each of the ac-BarringForEmergency parameter, the ac-BarringForMo-Signalling parameter, the ac-BarringForMo-Data parameter, and the ac-BarringForCSFB-r10 parameter is included in the ac-BarringInfo. On the other hand, each of the ac-BarringForEmergency parameter, the ac-BarringForMo-Signalling parameter, the ac-BarringForMo-Data parameter, and the ac-BarringForCSFB-r10 parameter may indicate the related service access barring according to a parameter value of each of the ac-BarringForEmergency parameter, the ac-BarringForMo-Signalling parameter, the ac-BarringForMo-Data parameter, and the ac-BarringForCSFB-r10 parameter. For example, in a case that each of the ac-BarringForEmergency parameter, the ac-BarringForMo-Signalling parameter, the ac-BarringForMo-Data parameter, and the ac-BarringForCSFB-r10 parameter is implemented by 1 bit, it will be assumed that a related parameter indicates the service access barring for the related service only if a parameter value of the related parameter is '1'.

The eNB 1013 may bar a service access to the eNB of UEs using an ssac-BarringForMMTEL-Voice-r9 parameter and an ssac-BarringForMMTEL-Video-r9 parameter processed in an upper layer not the RRC layer, e.g., a UI layer.

Each of the ssac-BarringForMMTEL-Voice-r9 parameter, and the ssac-BarringForMMTEL-Video-r9 parameter may indicate related service access barring if each of the ssac-BarringForMMTEL-Voice-r9 parameter, and the ssac-BarringForMMTEL-Video-r9 parameter is included in the ac-BarringInfo. On the other hand, each of the ssac-BarringForMMTEL-Voice-r9 parameter, and the ssac-BarringForMMTEL-Video-r9 parameter may indicate the related service access barring according to a parameter value of each of the ssac-BarringForMMTEL-Voice-r9 parameter, and the ssac-BarringForMMTEL-Video-r9 parameter. For example, in a case that each of the ssac-BarringForMMTEL-Voice-r9 parameter, and the ssac-BarringForMMTEL-Video-r9 parameter is implemented by 1 bit, it will be assumed that a related parameter indicates the service access barring for the related service only if a parameter value of the related parameter is '1'.

In FIG. 10, for convenience, the eNB bars a service access for the eNB using ac-BarringInfo processed in a RRC layer.

The eNB 1013 includes the generated ac-BarringInfo into SI, and broadcasts an SIB Type2 message including the SI including the ac-BarringInfo in order for UEs located in a service coverage area of the eNB 1013 to receive the SIB Type2 message in step 1017. In FIG. 10, the UE 1011 receives the SIB Type2 message broadcast by the eNB 1013, however, it will be understood by those of ordinary skill in the art that UEs which receive the SIB Type2 message may be all UEs located in the service coverage area of the eNB 1013.

The UE 1011 receives the SIB Type2 message, detects the ac-BarringInfo from the SI included in the received SIB Type2 message, and stores the detected ac-BarringInfo in step 1019.

The UE 1011 detects that a PS Voice Call is triggered in step 1021. Upon detecting that the PS Voice Call is triggered, the UE 1011 determines whether the UE 1011 may perform a service access to the eNB 1013 for the PS Voice Call by checking the ac-BarringInfo in step 1023. In FIG. 10, the UE 1011 may detect that a service access to the eNB 1013 is possible since the ac-BarringInfo includes the ac-BarringForMo-Data parameter. On the other hand, the UE 1011 intends to service access the eNB 1013 by transmitting a RRC Connection Request message including a ServiceAccessEnable parameter to the eNB 1013 since the UE 1011 decides that the PS Voice Call should be served even though a service access is barring in step 1025. A value of the ServiceAccessEnable parameter is set to a value indicating the PS Voice Call.

The eNB 1013 receives the RRC Connection Request message, and detects that the UE 1011 has intended to service access the eNB 1013 according to the PS Voice Call triggering by detecting the ServiceAccessEnable parameter form the RRC Connection Request message.

Figure 11:
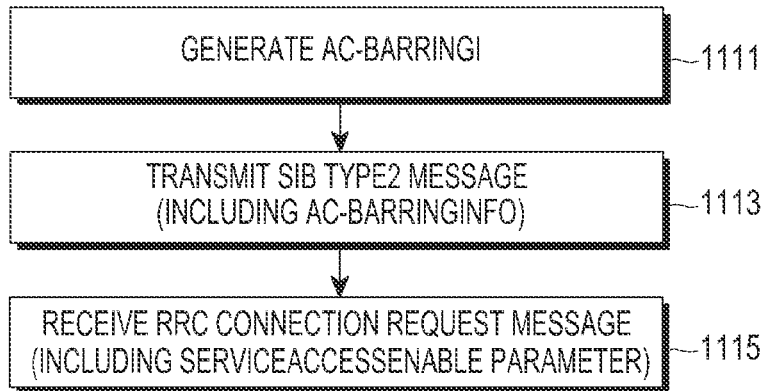
FIG. 11 illustrates an operation process of an eNB, such as the eNB illustrated in FIG. 10, according to an exemplary embodiment of the present invention.

FIG. 11 illustrates an operation process of an eNB, such as the eNB 1013 illustrated in FIG. 10, according to an exemplary embodiment of the present invention.

Referring to FIG. 11, the eNB 1013 generates ac-BarringInfo upon determining that there is a need for a service access barring by considering system parameters in step 1111. The ac-BarringInfo is described before with reference to FIG. 10, so a detailed description thereof will be omitted here. The eNB 1013 includes the generated ac-BarringInfo into SI, and broadcasts an SIB Type2 message including the SI including the ac-BarringInfo in order for UEs (including a UE 1011) located in a service coverage area of the eNB 1013 to receive the SIB Type2 message in step 1113. The eNB 713 receives a RRC Connection Request message including a ServiceAccessEnable parameter from the UE 1011 in step 1115. It is noted that the UE 1011 immediately transmits the RRC Connection Request message to the eNB 1013 without a service access barring according to a PS Voice Call triggering after determining that a PS Voice Call should be served in spite of service access barring of the eNB 1013.

Figure 12:
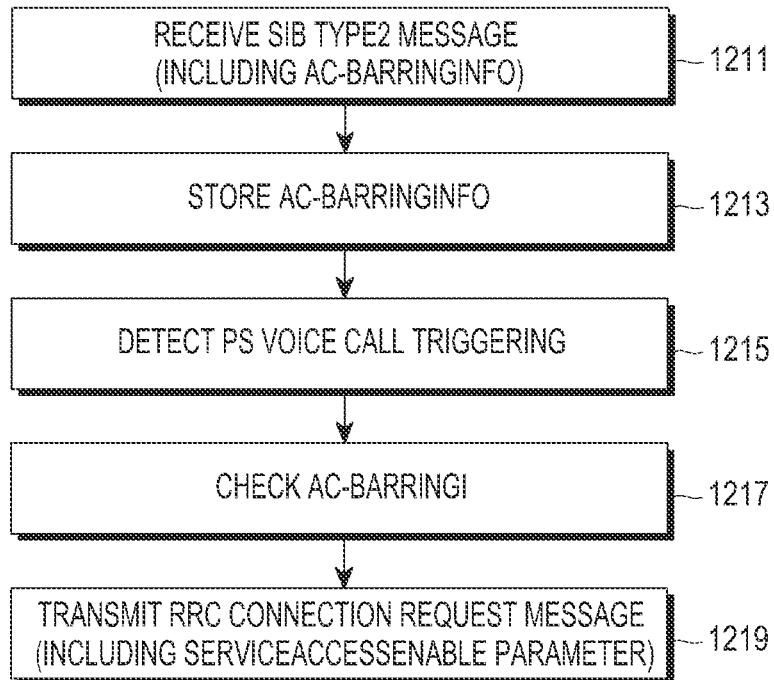
FIG. 12 illustrates an operation process of a UE, such as the UE illustrated in FIG. 10, according to an exemplary embodiment of the present invention.

FIG. 12 illustrates an operation process of a UE, such as the UE 1011 illustrated in FIG. 10, according to an exemplary embodiment of the present invention.

Referring to FIG. 12, the UE 1011 receives an SIB Type2 message including SI including ac-BarringInfo including an Access Enable Group parameter from eNB 1013 in step 1211. The UE 1011 detects the ac-BarringInfo from the SI included in the SIB Type2 message and stores the ac-BarringInfo in step 1213. The UE 1011 detects that a PS Voice Call is triggered in step 1215. The UE 1011 determines whether the UE 1011 may perform a service access to the eNB 1013 for the PS Voice Call by checking the stored ac-BarringInfo in step 1217. In FIG. 10, the UE 1011 may detect that the service access to the eNB 1013 is barring and there is no service access barring for the PS Voice Call since the ac-BarringInfo includes the ac-BarringForMo-Data parameter.

The UE 1011 transmits a RRC Connection message including a ServiceAccessEnable parameter for the PS Voice Call to the eNB 1013 since there is no service access barring for the PS Voice Call in step 1219.

As described with regard to FIGS. 10 to 12, in an LTE mobile communication system, a vice call service may be always provided anytime anywhere by including a ServiceAccessEnable parameter into a RRC Connection Request message.

In FIGS. 10 to 12, a service type of a service which is always possible to service access in a case that a service access to a specific eNB is barred in an LTE mobile communication system is a voice call service. However, it will be understood by those of ordinary skill in the art that a service access control process described in FIGS. 10 to 12 may be applied to other service different from the voice call service. The detailed description of the service type of the service which is always possible to service access in the case that the service access to the specific eNB is barred in the LTE mobile communication system will be omitted.

In FIGS. 10 to 12, a service access to a specific eNB is controlled by facilitating a service access to a voice call service in the case that the service access to the specific eNB is barred in the LTE mobile communication system. However, it will be understood by those of ordinary skill in the art that a service access may be controlled per a service, and a service characteristic without limiting a service access based on whether a service is the voice call service.

The description of a method for controlling a service access using a service characteristic will follow.

Each of services has a service characteristic, and the service characteristic may include data transmitting capacity, response/delay speed, data reliability, and a real-time communication characteristic such as a voice, a video conference, and a video call. So, an eNB may control a service access based on the service characteristic. That is, the eNB may control a service access according to a service characteristic of a related service regardless of a service type of the related service which a UE intends to receive.

For example, an eNB always allows a service access if a service characteristic has a real-time communication characteristic regardless of a service type. On the other hand, the eNB bars the service access if the service characteristic does not have the real-time communication characteristic regardless of the service type. The eNB always allows the service access if the service characteristic indicates a response/delay speed is less than a preset threshold response/delay speed regardless of the service type. On the other hand, the eNB bars the service access if the service characteristic does not indicate the response/delay speed is equal to or greater than the threshold response/delay speed regardless of the service type. Further, the eNB always allows the service access if a data transmitting capacity is less than a preset threshold data transmitting capacity regardless of the service type. On the other hand, the eNB bars the service access if the data transmitting capacity is equal to or greater than the threshold data transmitting capacity regardless of the service type.

That is, the eNB may bar or allow a service access on a basis of a service characteristic including data transmission capacity, response/delay speed, data reliability, and a real-time communication characteristic such as a voice, a video conference, and a video call.

In FIGS. 10 to 12, a service access to a specific eNB is controlled by facilitating a service access to a voice call service in the case that the service access to the specific eNB is barred in the LTE mobile communication system. However, it will be understood by those of ordinary skill in the art that a service access may be barred by including a voice call service, i.e., a PS Voice Call into an MO data.

Figure 13:
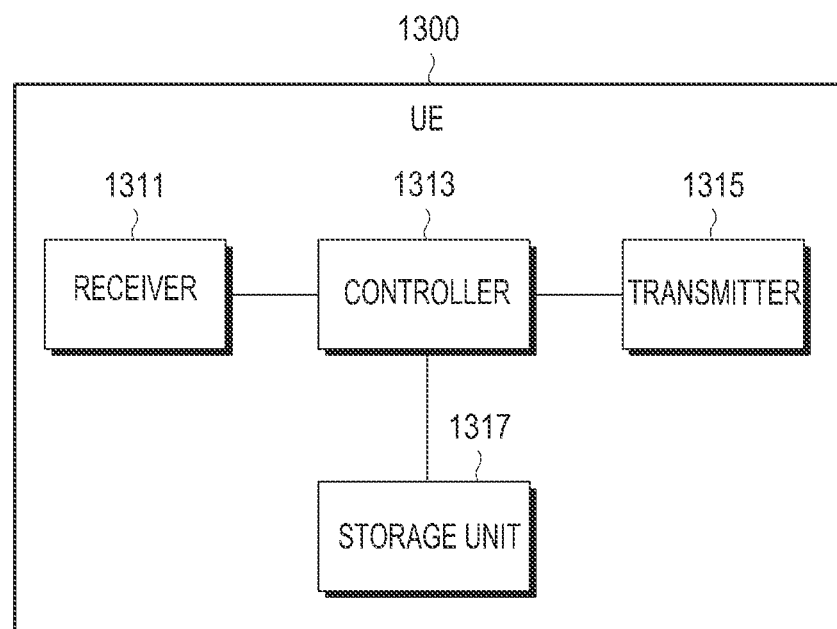
FIG. 13 illustrates an internal structure of a UE in an LTE communication system according to an exemplary embodiment of the present invention.

FIG. 13 illustrates an internal structure of a UE in an LTE communication system according to an exemplary embodiment of the present invention.

Referring to FIG. 13, a UE 1300 includes a receiver 1311, a controller 1313, a transmitter 1315, and a storage unit 1317.

The controller 1313 controls the overall operation of the UE 1300. In particular, the controller 1313 controls the UE 1300 to perform an operation of service accessing an eNB according to the first exemplary embodiment to the fourth exemplary embodiment of the present invention. The service access operation is performed in the manner described before with reference to FIGS. 1 to 12, so a detailed description thereof will be omitted here.

The receiver 1311 receives signals from an eNB, etc. under the control of the controller 1313. The signals received in the receiver 1311 are described before with reference to FIGS. 1 to 12, so a detailed description thereof will be omitted here.

The transmitter 1315 transmits signals to the eNB, etc. under the control of the controller 1313. The signals transmitted in the transmitter 1315 are described before with reference to FIGS. 1 to 12, so a detailed description thereof will be omitted here.

The storage unit 1317 stores the signals received by the receiver 1311 and data for the operation of the UE 1300, e.g., information related to the service access operation.

While the receiver 1311, the controller 1313, the transmitter 1315, and the storage unit 1317 are shown in FIG. 13 as separate units, it is to be understood that this is for merely convenience of description. In other words, two or more of the receiver 1311, the controller 1313, the transmitter 1315, and the storage unit 1317 may be incorporated into a single unit.

Figure 14:
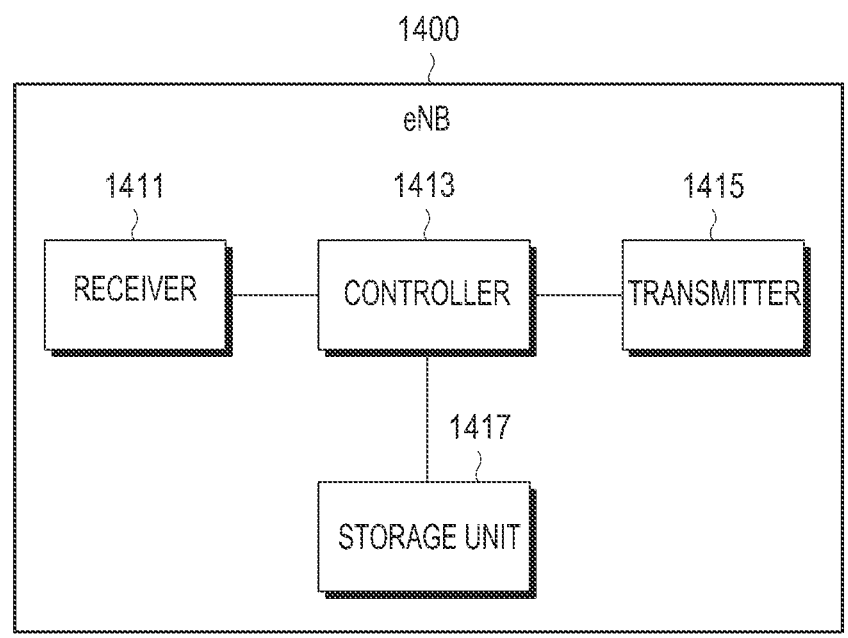
FIG. 14 illustrates an internal structure of an eNB in an LTE communication system according to an exemplary embodiment of the present invention.

FIG. 14 illustrates an internal structure of an eNB in an LTE communication system according to an exemplary embodiment of the present invention.

Referring to FIG. 14, an eNB 1400 includes a receiver 1411, a controller 1413, a transmitter 1415, and a storage unit 1417.

The controller 1413 controls the overall operation of the eNB 1400. In particular, the controller 1413 controls the eNB 1400 to perform an operation related to a service access operation in a UE according to the first exemplary embodiment to the fourth exemplary embodiment of the present invention. The operation related to the service access operation in the UE is performed in the manner described before with reference to FIGS. 1 to 12, so a detailed description thereof will be omitted here.

The receiver 1411 receives signals from the UE, etc. under a control of the controller 1413. The signals received in the receiver 1411 are described before with reference to FIGS. 1 to 12, so a detailed description thereof will be omitted here.

The transmitter 1415 transmits signals to the UE, etc. under a control of the controller 1413. The signals transmitted in the transmitter 1415 are described before with reference to FIGS. 1 to 12, so a detailed description thereof will be omitted here.

The storage unit 1417 stores the signals received by the receiver 1411 and data for an operation of the eNB 1400, e.g., information related to the service access operation in the UE.

While the receiver 1411, the controller 1413, the transmitter 1415, and the storage unit 1417 are shown in FIG. 14 as separate units, it is to be understood that this is for merely convenience of description. In other words, two or more of the receiver 1411, the controller 1413, the transmitter 1415, and the storage unit 1417 may be incorporated into a single unit.

As is apparent from the foregoing description, exemplary embodiments of the present invention enable to control a service access by considering at least one of a service type and a service priority in a packet data communication system.

Exemplary embodiments of the present invention enable control of a service access by considering a service characteristic in a packet data communication system.

Exemplary embodiments of the present invention enable a seamless service access by considering a characteristic of a service provided to a UE in a case that an eNB bars a service in a packet data communication system.

Exemplary embodiments of the present invention enhance a service quality of a service provided in a packet data communication system by facilitating a seamless service access in the packet data communication system.

Exemplary embodiments of the present invention enhance performance of a service access control function provided in a packet data communication system by facilitating that a service access control is performed by considering a service characteristic.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a user equipment (UE) in a packet data communication system, the method comprising:
receiving, from a base station (BS), system information including first information on access barring for mobile originating data;
identifying whether a packet service-based voice call is triggered;
identifying whether the system information includes second information indicating that an access for the packet service-based voice call is not barred;
identifying that an access to a cell is not barred in case that the packet service-based voice call is triggered and the system information includes the second information; and
transmitting, to the BS, a radio resource control (RRC) connection request message for the packet service-based voice call in case that the access to the cell is not barred.

2. The method of claim 1, further comprising:
identifying that an access to the cell is barred based on the first information in case that the packet service-based voice call is triggered and the system information does not include the second information.

3. The method of claim 2, further comprising:
suspending transmission of the RRC connection request message for the packet service-based voice call in case that the access to the cell is barred.

4. The method of claim 1, further comprising:
identifying whether a mobile originating call is triggered; and
suspending transmission of an RRC connection request message for the mobile originating call based on the first information in case that the mobile originating call is triggered.

5. The method of claim 4, further comprising:
identifying that the access to the cell is barred based on the first information in case that the mobile originating call is triggered.

6. A user equipment (UE) in a packet data communication system, the UE comprising:
a transceiver; and
a processor connected to the transceiver, wherein the processor is configured to:
control the transceiver to receive, from a base station (BS), system information including first information on access barring for mobile originating data,
identify whether a packet service-based voice call is triggered,
identify whether the system information includes second information indicating that an access for the packet service-based voice call is not barred,
identify that an access to a cell is not barred in case that the packet service-based voice call is triggered and the system information includes the second information, and
control the transceiver to transmit, to the BS, a radio resource control (RRC) connection request message for the packet service-based voice call in case that the access to the cell is not barred.

7. The UE of claim 6, wherein the processor is further configured to:
identify that the access to the cell is barred based on the first information in case that the packet service-based voice call is triggered and the system information does not include the second information.

8. The UE of claim 7, wherein the processor is further configured to:
suspend transmission of the RRC connection request message for the packet service-based voice call in case that the access to the cell is barred.

9. The UE of claim 6, wherein the processor is further configured to:
identify whether a mobile originating call is triggered, and
suspend transmission of an RRC connection request message for the mobile originating call based on the first information in case that the mobile originating call is triggered.

10. The UE of claim 9, wherein the processor is further configured to:
identify that the access to the cell is barred based on the first information in case that the mobile originating call is triggered.

11. A base station (BS) in a packet data communication system, the BS comprising:
a transceiver; and
a processor connected to the transceiver, wherein the processor is configured to:
control the transceiver to broadcast system information including first information on access barring for mobile originating data and second information indicating that an access for a packet service-based voice call is not barred, and
control the transceiver to receive, from a user equipment (UE), a radio resource control (RRC) connection request message, wherein the RRC connection request message is received in case that the packet service-based voice call is triggered in the UE, and wherein the RRC connection request message is for the packet service-based voice call.

12. The BS of claim 11, wherein transmission of an RRC connection request message for a mobile originating call is suspended based on the first information in case that the mobile originating call is triggered in the UE.

13. A method of a base station (BS) in a packet data communication system, the method comprising:

broadcasting system information including first information on access barring for mobile originating data and second information indicating that an access for a packet service-based voice call is not barred; and receiving a radio resource control (RRC) connection request message from a user equipment (UE), wherein the RRC connection request message is received in case that the packet service-based voice call is triggered in the UE, and wherein the RRC connection request message is for the packet service-based voice call.

14. The method of claim 13, wherein transmission of an RRC connection request message for a mobile originating call is suspended based on the first information in case that the mobile originating call is triggered in the UE.

* * * * *